ated Feb. 1, 1972

United States Patent Office

3,639,631
METHOD OF CONTROLLING FUNGI AND BACTERIA

George Gerald Badcock, New Brighton, and Wilfred James Cecil Dyke, Upton-by-Chester, England, assignors to Evans Medical Limited, Liverpool, Lancashire, England
No Drawing. Continuation-in-part of application Ser. No. 481,122, Aug. 19, 1965. This application Jan. 15, 1970, Ser. No. 3,206
Claims priority, application Great Britain, Aug. 24, 1964, 34,538/64
Int. Cl. A01n 9/20
U.S. Cl. 424—326          9 Claims

ABSTRACT OF THE DISCLOSURE

Compositions for horticultural or agricultural use containing as an active ingredient, a compound of the general formula:

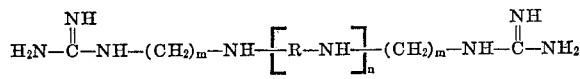

or acid addition salts thereof, wherein R is alkylene of 3 to 6 carbon atoms, m is 3 to 12, and n is 0 to 2, in an amount effective to control or prevent attack by plant pathogens, and a non-phytotoxic carrier, extender or diluent.

---

This application is a continuation-in-part of application Ser. No. 481,122, dated Aug. 19, 1965, now U.S. Pat. No. 3,499,927, issued Mar. 10, 1970.

This invention is concerned with a method of protecting plants against plant pathogens and with formulations for use in this method.

We have found that certain novel guanidino derivatives of polyalkylene polyamines, which are described and claimed in said application Ser. No. 481,122, possess valuable activity against plant pathogens, for example, the fungi *Erysiphe graminis*, *Venturia inaequalis*, *Podosphaera leucotricha*, *Uromyces fabae*, *Botrytis fabae* and *Cercospora melonis;* and the bacteria *Xanthomonas medicaginis*, *Pseudomonas medicaginis* and *Xanthomonas malvacearum*.

The new guanidino derivatives possess activity against a wide range of diseases and a relatively low toxicity to mammals and those qualities coupled with a low phytotoxicity render the derivatives particularly useful in the treatment of both growing plants and seeds. They are, in particular, very much less toxic than the organic mercurial fungicides which are conventionally used at the present time.

According to the present invention we provide compositions for horticultural or agricultural use containing as active ingredient an effective amount of a compound selected from the group consisting of compounds of the general formula

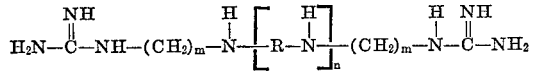

and the acid addition salts thereof, wherein R is alkylene of 3 to 6 carbon atoms, m is 3 to 12 and n is 0 to 2, in association with a non-phytotoxic carrier, extender or diluent. The carrier, extender or diluent is preferably selected from the group consisting of a solid carrier and a liquid carrier said liquid carrier being in association with an additive selected from the group consisting of a wetting agent, a dispersing agent, an emulsifying agent, a dyestuff, an insecticide, a second antifungal agent, a bird-repellant and a growth-promoting hormone n is preferably 0 or 1.

Particularly preferred compounds for use in compositions according to the invention are N,N'-bis-(3-guanidinopropyl) hexamethylene-diamine, N,N'-bis-(6-guanidinohexyl) hexamethylenediamine, bis-(8-guanidinooctyl)-amine, bis-(10-guanidinodecyl)amine and bis-(12-guanidinododecyl)amine which have shown interesting activity against certain plant pathogenic fungi. The last named compound has also shown useful anti-bacterial activity and bis-(8-guanidinooctyl)-amine has shown particularly interesting activity against certain plant pathogenic fungi.

The bases used in compositions according to the invention have a number of basic groups and can therefore form mono-, di- and poly-acid addition salts. Such salts include, for example, salts with mineral acids, e.g. hydrochlorides, hydrobromides, sulphates (mono-, sesqui or poly), perchlorates, nitrates, phosphates, pyrophosphates etc. and salts with organic acids, e.g. formates acetates, propionates, glycolates, lactates, pyruvates, malonates, succinates, maleates, fumarates, malates, tartrates, citrates, oxalates, benzoates, salicylates, methanesulphonates, ethanesulphonates, p-toluene sulphonates, acetylsalicylates etc. The sesquisulphate of bis-(8-guanidino octyl)amine is particularly preferred where low solubility is required, and furthermore this compound is especially stable to storage.

Studies made on the toxicity of the above sesquisulphate and the free base thereof have shown the following:

For rats, an acute oral $LD_{50}$ of 550 mg./kg. was found for the sesquisulphate. The percutaneous $LD_{50}$ was greater than 1000 mg./kg. and the intraperitoneal $LD_{50}$ was 25 mg./kg.

The oral $LD_{50}$ for hens was shown to be 125 mg./kg.

The free base was used to obtain $LD_{50}$ figures for mice. The subcutaneous $LD_{50}$ was 28 mg./kg. and the intravenous $LD_{50}$, 25 mg./kg.

The compositions may contain liquid or solid extenders or diluents and be designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc.; in such cases the carrier is a solvent or emulsion base non-phytotoxic under the conditions of use. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating mixtures wherein the compound is associated with a solid pyrotechnic component. In these formulations, the concentration of active material is preferably between 0.01% and 40% by weight. The composition may include one or more further fungicides or bactericides or other active substances of use in agriculture or horticulture.

Examples of diluents for solid preparations include aluminium silicates, silica, gypsum, iron oxide (especially Persian Gulf oxide) and carbonates. Such diluents must, of course, be chemically compatible with the active ingredients.

Wettable powder formulations may be prepared, for example, by grinding the salt with very finely divided aluminium silicate clay fractions together with suitable wetting and suspending agents. These, when diluted with water, give suspensions of the salt which can be sprayed onto plants.

Examples of suitable wetting and suspending agents are polyoxyethylene glycol ethers, sulphates of long chain alkyl fatty alcohols, sulphonates derived from refining of petroleum oil, calcium lignosulphates, cellulose ethers and alginates. Suitable binding agents include, again, calcium lignosulphates, cellulose ethers and alginates.

A particularly advantageous preparation in combatting seed-borne diseases comprises a seed dressing which may be liquid or solid. Liquid seed dressing, for example, comprises a solution of a soluble salt of a guanidino derivative as defined above, e.g. the acetate, in which the seed to be treated can be steeped. Alternatively, solid seed dressings, for example, comprise dusts and powders containing a soluble or insoluble salt of bis-(8-guanidinooctyl)-amine which may be mixed with the seed. The insoluble salt is advantageously the sesquisulphate.

Seed dressings may conveniently be applied using specialized machinery, either by mixing the powder formulation with the seed to be dressed, in a closed container, capable of mixing by rotation in the required proportions, or by metering the seed dressing continuously, at a selected rate, into a controlled stream of seed, using a screw device or auger to ensure uniform mixing and throughput. Powder seed dressings advantageously contain for example 20-40% of active ingredient for use at rates of for example, 2-4 oz. per bushel (60 lb.) cereal seed. Liquid formulations, for instance, contain 40% w./v. a water-soluble active ingredient in water, and be applied at the rate of 2 fl. oz. per bushel of seed. With seed dressings only one application is normally used.

The compositions according to the present invention may be used to combat infections of plant pathogens or to prevent infections occurring. It is naturally preferable to use the compositions in a prophylactic manner and to this end the plants or viable parts thereof such as seeds, cuttings, layers, runners, roots, tubers, bulbs, corms or grafts are treated with a composition according to the invention by spraying, dusting, drenching, steeping or dipping.

In use, liquid preparations, i.e. solutions of salts or wettable powder suspensions for application to growing plants may be diluted to the required concentration and applied to the plants by conventional spray machines. For example, for the application to growing plants in the control of leaf fungus diseases, aqueous solutions of a soluble salt e.g. the acetate, citrate, lactate, or phosphate would be applied at a dilution of 100-400 p.p.m. Up to six applications at 7-14 day intervals could be used.

Dusts can be applied to growing plants by conventional machines which have been used in pest control for many years.

The compositions have been shown to be active against a wide range of plant pathogenic organisms. In particular among fungal diseases one may mention leaf spot and stripe in cereals, e.g. *Helminthosporium* (=*Pyrenophora*) *avenae* and *H. gramineum* the fusarium wilts, both in cereals and other families, such as *Fusarium nivale* (brown foot rot of wheat), *F. graminearum*, *F. bulbigenum* and *F. culmorum*; loose smut in cereals, *Ustilago* e.g. *U. avenae in oats*, *U. nuda*, *U. hordei*, *U. Kolleri* and *U. mayolis*; the soft rots, e.g. *Botrytis fabae* on beans and *B. cinerea*; the mildews, e.g. *Erysiphe graminis* (barley), *Podosphaera leucotricha* (apple) and also *Sphaerotheca pannosa* (roses); scabs, e.g. *Venturia inaequalis* (apple scab) and *Rhizoctonia solani* (russet scab or stem canker of potatoes); root rots, e.g. *Pythium aphenidermatum* (damping off) and *Phom betae* (beet rot); rusts, e.g. *Uromyces fabae*; take-all or whiteheads in cereals, *Ophiobolus graminis;* Cercospora melonis; glume blotch in cereals, *Septoria* (=*Leptosphaeria*) *nodorum*; bunt of wheat, *Tilletia caries;* black spot of roses, *Diplocarpon rosae;* late blight of potatoes, *Phytophthora infestans*; and *Colletorrichum coffeanum* on coffee.

Among bacterial plant diseases one may mention xanthomonas, e.g. *X. medicaginis* and *X. malvacearum* (on cotton) and pseudomonas, e.g. *Pseudomonas medicaginis*.

The following Tables I to XIII show the results of testing compositions according to the invention against various plant pathogens. The compounds referred to by number are as follows:

Compound 1: N,N'-bis-(3-guanidinopropyl)hexamethylenediamine hydrochloride;
Compound 2: N,N'-bis-(6-guanidinohexyl)hexamethylenediamine sulphate;
Compound 3: bis-(10-guanidinodecyl)amine sulphate;
Compound 4: bis-(12-guanidinododecyl)amine hydrochloride;
Compound 5: bis-(8-guanidinooctyl)amine sesquisulphate.

Table I shows the $LD_{95}$ values for the products of Compounds 1, 3 and 4 against certain plant pathogenic fungi as determined by the method of Pianka and Hall (J. Sci. Food and Agri., 1957, 432). Table II shows the activity of Compounds 3 and 4 against *Botrytis fabae*, *Venturia inaequalis* and *Uromyces fabae* assessed by the leaf disc technique.

Table III shows the results of testing compounds 2, 3, 4 and 5 against *Venturia inaequalis*, *Erysiphe graminis* and *Podosphaera leucotricha* by inoculating both treated and untreated leaves with the pathogen spores (Cross, McWilliam and Rhodes, J. Gen. Microbiol, 34, 51-65, 1964).

Table IV shows the results of growth tests against a number of seed disease organisms in respect of compounds 2 and 3.

Table V shows results of in vitro minimum inhibitory concentration test against various pathogens on agar plates (Cup Plate Assays) in respect of compounds 2, 3, 4 and 5.

Tables VI to XII show the results of field trials of the use of compound 5 as a prophylactic seed-dressing against a number of economically important seed-borne diseases. The standard of comparison was an organomercurial seed-dressing containing 1% mercury in the form of phenyl mercury acetate and ethyl mercury chloride. Compound 5 was used in the form of a powder seed-dressing.

TABLE I

| Compound | $LD_{95}$ | | | |
| --- | --- | --- | --- | --- |
| | Cercospora melonis | Venturia inaequalis | Botrytis cinerea | Fusarium bulbigenum |
| 1 | 10 | 90 | 10 | 100 |
| 3 | 10 | 18 | 10 | 50 |
| 4 | 10 | 25 | 10 | 50 |

TABLE II

| Compound | Conc. | Botrytis fabae, percent kill | Uromyces fabae, percent kill | Venturia inaequalis, percent kill |
| --- | --- | --- | --- | --- |
| 3 | 100 | 97 | 99+ | |
| | 50 | 98 | | |
| | 10 | 91 | | |
| | 300 | | | 96 |
| 4 | 100 | 97 | 97 | |
| | 50 | 94 | | |
| | 10 | 46 | | |

TABLE III

| | Venturia inaequalis (apple scab) spore germination test [1] p.p.m. | Apple scab greenhouse test [2] | | Barley mildew (Erysiphe graminis) greenhouse test [3] | Apple mildew (Podosphaera leucotricha) greenhouse test [2] | |
|---|---|---|---|---|---|---|
| | | 200 p.p.m. | 50 p.p.m. | 200 p.p.m. | 200 p.p.m. | 100 p.p.m. |
| Compound: | | | | | | |
| 2 | 10 | | | 19% | | |
| 3 | 10 | 83% | 57% | 76% | 39% | 40% |
| 4 | 5 | 41% | | 6% | 18% | 17% |
| 5 | 20 | 99% | 94% | 98% | 77% | 74% |

[1] Minimum inhibiting concentration.
[2] Compounds sprayed on leaves of potted apple rootstocks.
[3] Compounds sprayed on leaves of barley plants in pots.

TABLE IV.—GROWTH TESTS AGAINST SELECTED SEED DISEASE ORGANISMS

Figures represent percentage of healthy plants in respectively, the treated and the untreated batches of plants

| | Fusarium culmorum, percent | Fusarium graminearum, percent | Helminthosporium avenae | Helminthosporium graminearum | Ustilago avenae | Ustilago rolleri | Ustilago nuda | Ustilago tordei | Fusarium culmorum, percent | Fusarium nivale, percent | Phoma betae, percent | Xanthomonas malvacearum, percent | Fusarium nivale, percent |
|---|---|---|---|---|---|---|---|---|---|---|---|---|---|

Figures represent number of diseased roots in respectively, the treated and untreated plants, Ophiobolus graminis

| Compound: | | | | | | |
| 2 | 95 | 36 | 32 | 68 | ... | ... |
| 3 | ... | 47 | 32 | ... | ... | ... |

(Data combined: Compound 2: Fusarium culmorum 95; Compound 3: Fusarium graminearum 36/47; Helminthosporium avenae 32/32; Helminthosporium gramineum 68; Fusarium nivale 54; Phoma betae 43/45; Xanthomonas malvacearum 21/21; Ophiobolus graminis 38; and 10, 24, 40.)

TABLE V.—IN VITRO LABORATORY TESTS ON AGAR PLATES ZONE SIZES GIVEN BY THE COMPOUNDS WHEN ASSAYED AGAINST THE NAMED SEED DISEASE ORGANISMS [1]

| Concentration, p.p.m. | Ustilago nuda | | Ustilago tordei | | Ustilago rolleri | | Ustilago avenae | | Helminthosporium gramineum | | Helminthosporium avenae | | Fusarium culmorum | | Fusarium nivale | | Phoma betae | | Xanthomonas medicaginis | | Ophiobolus graminis | | Pythium aphanidermatum | | Pseudomonas medicaginis | | Ustilago mayolis | | Rhizoctonia solani | |
|---|---|---|---|---|---|---|---|---|---|---|---|---|---|---|---|---|---|---|---|---|---|---|---|---|---|---|---|---|---|
| | 200 | 20 | 200 | 20 | 200 | 20 | 200 | 20 | 200 | 20 | 200 | 20 | 200 | 20 | 200 | 20 | 200 | 20 | 200 | 20 | 200 | 20 | 200 | 20 | 200 | 20 | 200 | 20 | 200 | 20 |
| Compound: | | | | | | | | | | | | | | | | | | | | | | | | | | | | | | |
| 2 | 15.8 mm. | 0 | 13.4 mm. | 0 | 17.0 | 0 | 14.8 | 0 | Trace | 0 | 18.2 | 0 | 21.5 | 0 | 14.2 | 0 | 15.1 | 0 | 11.2 | 0 | 24.9 | 0 | 18.2 | 14.2 | 0 | 0 | 18.6 | 0 | 0 | 0 |
| 3 | 12.2 mm. | 0 | Trace | 0 | Trace | 0 | Trace | 0 | 21.0 | 14.6 | 18.1 | 13.6 | 18.3 | 13.7 | 16.8 | | 18.0 | 11.1 | 13.6 | | 15.0 | | 19.9 | | 11.5 | | 11.0 | 21.8 | 15.0 | |
| 4 | 0 | 0 | Trace | 0 | 25.7 | 21.8 | 31.5 | Trace | 0 | 12.5 | 12.5 | | 28.2 | | 11.4 | | 11.1 | | 19.0 | 15.5 | 24.9 | | Trace | | 0 | | 12.5 | 13.8 | | |
| 5 | 0 | 0 | 18.6 | 17.6 | 25.7 | 21.8 | 31.0 | 31.5 | 18.9 | 12.3 | 19.6 | 15.5 | 28.7 | | 28.0 | | 16.1 | | 15.0 | | 26.0 | | 31.9 | 31.0 | 0 | | 0 | 0 | 0 | |

[1] Zone sizes in mm.

TABLE VI
Control of *Fusarium nivale* in spring wheat

| Treatment | Rate, gm./kg. | Emergence plates/ft. row | Yield, lb./plot | Health test, percent healthy |
|---|---|---|---|---|
| 40% Compound 5 | 2 | 19.6 | 64 | 77 |
| 1% organo Hg | 2 | 22.1 | 67 | 75 |
| Untreated | | 5.3 | 54 | 61 |

TABLE VII
Control of *Fusarium nivale* in spring wheat (field trial)

| Treatment | Rate, gm./kg. | Disease assessment, percent healthy |
|---|---|---|
| 40% Compound 5 | 2 | 89.5 |
| 30% Compound 5 | 2 | 90.2 |
| 20% Compound 5 | 2 | 90.5 |
| 1% organo-Hg | 2 | 92.2 |
| Untreated | | 62.5 |

TABLE VIII
Control of *Septoria nodorum* in winter wheat

| Treatment | Rate, gm./kg. | Health test, percent healthy |
|---|---|---|
| 40% Compound 5 | 2 | 97.5 |
| 30% Compound 5 | 2 | 95.5 |
| 20% Compound 5 | 2 | 97.5 |
| 1% organo-mercury | 2 | 94.0 |
| Untreated | | 75.7 |

TABLE IX
Control of *Helminthosporium gramineum* in spring barley

| Treatment | Rate, gm./kg. | Disease score, max.=2,000 | Infected ears per plot |
|---|---|---|---|
| 40% Compound 5 | 2 | 174 | 424 |
| 1% organo-Hg | 2 | 222 | 18 |
| Untreated | | 602 | 2,125 |

TABLE X
Control of *Helminthosporium avenae* in spring oats

| Treatment | Rate, gm./kg. | Disease assessment, percent healthy |
|---|---|---|
| 40% Compound 5 | 2 | 96.7 |
| 30% Compound 5 | 2 | 89.0 |
| 20% Compound 5 | 2 | 89.2 |
| 1% organo-mercury | 2 | 89.7 |
| Untreated | | 70.7 |

TABLE XI
Control of *Tilletia caries* in spring wheat

| Treatment | Rate, gm./kg. | Bunted ears per plot |
|---|---|---|
| 40% Compound 5 | 2 | 10.5 |
| 1% organo-mercury | 2 | 1.5 |
| Untreated | | 228.5 |

TABLE XII
Control of *Ustilago avenae* in spring oats

| Treatment | Rate, gm./kg. | Smutted ears per plot |
|---|---|---|
| 30% Compound 5 | 2 | 19 |
| 1% organo-mercury | 2 | 19 |
| Untreated | | 112 |

The compositions thus show useful activity against a wide range of plant pathogenic organisms and have an activity against seed-borne diseases comparable with that of organo mercurials and are very much less toxic to warm blooded mammals including humans. They also may be used against foliage and stem diseases and possess a very low phytotoxicity.

Accordingly we also provide a method of protecting plants against plant diseases, wherein plants, including viable parts of plants such as seeds, cuttings, layers, runners, roots, tubers, bulbs, corms or grafts, infected or non-infected with one or more plant pathogenic bacteria or fungi are treated with a composition containing a guanidino derivative as defined above.

Treatment may be effected either before any infection has occurred in order to prevent infection or after infection has occurred to eradicate the infection or control it.

The following examples illustrate preferred embodiments of the invention.

EXAMPLE 1

Wettable powder 25%

Formula: Parts
Bis-(12-guanidinododecyl)-amine hydrochloride 25
Fatty alcohol sulphonate 0.5
Calcium lignosulphonate 6
China clay to 100

EXAMPLE 2

Soluble 0.05%

Formula: Parts
Bis - (12 - guanidinodecyl) - amine hydrochloride 5
Water 10,000

EXAMPLE 3

Wettable powder 25%

Formula: Parts
Bis-(10-guanidinodecyl)-amine hydrochloride 25
Fatty alcohol sulphonate 0.5
Calcium lignosulphonate 6
China clay to 100

EXAMPLE 4

Soluble 0.05%

Formula: Parts
Bis - (10 - guanidinodecyl) - amine hydrochloride 5
Water 10,000

EXAMPLE 5

Wettable powder 25%

Formula: Parts
Bis-(8-guanidinooctyl)-amine sulphate 25
Fatty alcohol sulphonate 0.5
Calcium lignosulphonate 6
China clay to 100

EXAMPLE 6

Soluble 0.05%

Formula: Parts
Bis-(8-guanidinooctyl)-amine sulphate 5
Water 10,000

EXAMPLE 7

Dry seed dressing containing 40%, 30% or 20% active ingredient

| | 40% | 30% | 20% |
|---|---|---|---|
| Bis-(8-guanidinooctyl)amine sesquisulphate (micronised), lbs | 400 | 300 | 200 |
| Persian Gulf oxide, lbs | 50 | 50 | 50 |
| China clay F, lbs | 550 | 650 | 750 |
| Coarse milled, lbs | 1,000 | 1,000 | 1,000 |
| Packing density, in. $^3$/lb | 88 | 83 | 76 |

EXAMPLE 8

Liquid seed dressing

| | | |
|---|---|---|
| Phosphoric acid, 90% | lbs | 125.9 |
| Water | gals | 25 |
| Bis-(8-guanidinooctyl)amine carbonate | lbs | 173.1 |
| Water | gals | 50 |
| Sorbester Q.12 | lbs | 5 |
| Rhodamine B, 500% | lbs | 5 |
| Water to 100 gals. | gals. (approx.) | 3 |
| Sp. gravity | | 1.09 |

EXAMPLE 9

Liquid seed dressing

| | G. |
|---|---|
| Bis-(8-guanidinooctyl)amine triacetate | 40 |
| Water to 100 ml. | |

We claim:

1. A composition for horticultural or agricultural use comprising an effective amount for controlling pathogenic fungi and bacteria of a compound of the formula

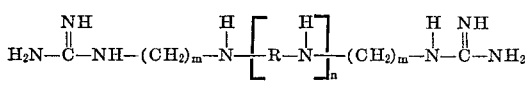

or the acid addition salt thereof, wherein R is alkylene of 3 to 6 carbon atoms, $m$ is 3 to 12 and $n$ is 0 to 2, and a non-phytotoxic carrier, extender or diluent.

2. A composition according to claim 1 containing a compound selected from the group consisting of N,N'-bis-(3-guanidinopropyl)hexamethylenediamine, N,N'-bis-(6-guanidinohexyl) hexamethylenediamine, bis-(8-guanidinooctyl)amine, bis-(10-guanidinodecyl)amine, bis-(12-guanidino-dodecyl)amine and acid addition salts thereof.

3. A composition according to claim 1 containing bis-(8-guanidinooctyl)amine sesquisulphate.

4. A composition according to claim 1 in a form selected from the group consisting of a seed dressing, a spray, an aerosol, a dust and a powder.

5. A composition according to claim 1 containing 0.01% to 40% by weight of active ingredient.

6. A method for controlling infection of plants by pathogenic fungi and bacteria comprising applying to said plants, an effective amount for controlling pathogenic fungi and bacteria of a compound as defined in claim 1.

7. A method as claimed in claim 6 in which seeds are treated with a seed dressing containing a compound as defined in claim 1.

8. A method as claimed in claim 6 in which growing plants are treated with a compound as defined in claim 1.

9. A method as claimed in claim 6 in which the said compound as defined in claim 1 is an acid addition salt of bis-(8-guanidinooctyl)amine.

References Cited

UNITED STATES PATENTS

| | | | |
|---|---|---|---|
| 2,460,733 | 2/1949 | Beuson et al. | 260—583 |
| 3,010,782 | 11/1961 | McCaleb et al. | 21—2.7 |
| 3,200,151 | 8/1965 | Spickett et al. | 260—564 |
| 3,283,003 | 11/1966 | Jack et al. | 260—564 |

OTHER REFERENCES

Chey mol et al., Chemical Abstracts 60: 13,138–39 (1964). Robin et al., Chemical Abstracts 55: 16,419 (1961). Robin et al., Chemical Abstracts 58: 11,613 (1963). Short et al., J. Med. Chem., vol. 6, pp. 275–83 (1963).

JEROME D. GOLDBERG, Primary Examiner